United States Patent
Kellner et al.

(10) Patent No.: US 10,229,122 B2
(45) Date of Patent: Mar. 12, 2019

(54) EXTENSIBLE CUSTOMIZATION MIGRATION VIA PLUGGABLE INTERFACE

(71) Applicant: Oracle International Corporation, Redwood Shores, CA (US)

(72) Inventors: George Kellner, San Mateo, CA (US); Revathy Narasimhan, Cupertino, CA (US); Deena Philip, Sunnyvale, CA (US); Mohan Arthur, San Ramon, CA (US); Sayantan Chatterjee, Kolkata (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 444 days.

(21) Appl. No.: 14/478,693

(22) Filed: Sep. 5, 2014

(65) Prior Publication Data

US 2015/0074056 A1  Mar. 12, 2015

Related U.S. Application Data

(60) Provisional application No. 61/874,910, filed on Sep. 6, 2013.

(51) Int. Cl.
| | |
|---|---|
| *G06F 17/30* | (2006.01) |
| *G06F 11/14* | (2006.01) |
| *H04L 29/08* | (2006.01) |
| *H04W 4/60* | (2018.01) |
| *H04W 4/00* | (2018.01) |

(52) U.S. Cl.
CPC .... *G06F 17/30073* (2013.01); *G06F 11/1446* (2013.01); *G06F 17/303* (2013.01); *H04L 67/1097* (2013.01); *H04W 4/003* (2013.01); *H04W 4/60* (2018.02)

(58) Field of Classification Search
CPC .......... G06F 17/30073; G06F 11/1446; G06F 17/303; H04L 67/1097; H04W 4/003
USPC ...................................................... 707/640
See application file for complete search history.

(56) References Cited

U.S. PATENT DOCUMENTS

| | | | |
|---|---|---|---|
| 2011/0191304 A1* | 8/2011 | Ristow .................... | G06F 17/30 707/690 |
| 2012/0203742 A1* | 8/2012 | Goodman ........... | G06F 11/1461 707/646 |
| 2014/0279880 A1* | 9/2014 | Mills ................. | G06F 17/30578 707/613 |

(Continued)

*Primary Examiner* — Hicham Skhoun
(74) *Attorney, Agent, or Firm* — Kilpatrick Townsend & Stockton LLP

(57) ABSTRACT

A pluggable migration framework can interface with a plurality of repositories that store metadata related to one or more applications. A user can customize the applications to suit the user's business requirements. The user can develop and test the customized applications in a source environment, and the customized features can be stored as metadata in one or more of the plurality of repositories. When the customized application is ready to be used by others, it can be migrated to a target environment. The pluggable migration framework can include an orchestrator that enables the user to export metadata from the plurality of repositories in the source environment, and import the metadata to a plurality of repositories in the target environment, without requiring the user to re-implement the custom features.

26 Claims, 10 Drawing Sheets

(56) References Cited

U.S. PATENT DOCUMENTS

2014/0289287 A1* 9/2014 Arrouye ............ G06F 17/30067
　　　　　　　　　　　　　　　　　　　707/825
2014/0289391 A1* 9/2014 Balaji .................... H04L 43/04
　　　　　　　　　　　　　　　　　　　709/224
2014/0297516 A1* 10/2014 Brown ................ G06F 3/04817
　　　　　　　　　　　　　　　　　　　705/39

* cited by examiner

EXTENSIBLE CUSTOMIZATION MIGRATION VIA PLUGGABLE INTERFACE

CROSS-REFERENCE TO RELATED APPLICATIONS

This application claims priority to U.S. Provisional Patent Application No. 61/874,910, filed Sep. 6, 2013, entitled "EXTENSIBLE CUSTOMIZATION MIGRATION VIA PLUGGABLE INTERFACE," the disclosure of which is hereby incorporated in its entirety by reference for all purposes.

BACKGROUND

Embodiments of the present invention are related to application development and deployment and, in particular, to extensible customization migration via pluggable interface.

Software as a service (SaaS) is an increasingly popular software model, where customers can purchase subscriptions to use applications that are hosted centrally (e.g., in a cloud computing environment). Like traditional software applications, there is demand by customers to customize SaaS applications to their own particular needs. For example, a business customer may customize the appearance of the applications, add or remove functionality, change security settings, etc. to suit their particular needs.

Software customizations can be created and tested in a development environment prior to deployment. Migration tools can be used to move software applications between development and deployment environments. However, traditional migration tools are technology specific, which can require customers to maintain and be familiar with several different migration tools to support their software applications. Additionally, migration tools typically require knowledge of many disparate underlying technologies to ensure that the software applications are correctly and completely migrated. Further, SaaS customers do not typically have access to the underlying interfaces and tools needed to migrate applications, requiring the customer to wait for the SaaS provider's technical support to deploy their customized applications.

SUMMARY

Embodiments of the present invention are directed to systems and methods for a pluggable migration framework that manages the transfer of application customizations between environments. A pluggable migration framework can interface with a plurality of repositories that store metadata related to one or more applications. A user can customize the applications to suit the user's business requirements. The user can develop and test the customized applications in a source environment, and the customized features can be stored as metadata in one or more of the plurality of repositories. When the customized application is ready to be used by others, it can be migrated to a target environment. The pluggable migration framework can include an orchestrator that enables the user to export metadata from the plurality of repositories in the source environment, and import the metadata to a plurality of repositories in the target environment, without requiring the user to re-implement the custom features.

In some embodiments, a method of migrating application customizations between environments can include receiving a request at an orchestrator, executing on a computer including a computer readable medium and processor, to export application customizations, wherein the request is received from a source environment. The method can further include archiving metadata from one or more repositories in the source environment to create a metadata archive; and receiving a request to download the metadata archive from the source environment. The method can further include receiving a request at the orchestrator to import the application customizations, wherein the request is received from a target environment and wherein the request includes the metadata archive; and sending instructions to each of the one or more repositories in the target environment to import the metadata from the metadata archive.

In some embodiments, the instructions to export, import, backup, and/or restore sent to each of the plurality of repositories in the target environment are sent in parallel. The one or more repositories can be a subset of a plurality of repositories, that are identified using a migration hierarchy that defines dependencies among the plurality of repositories.

In some embodiments, receiving a request at an orchestrator, executing on a computer including a computer readable medium and processor, to export application customizations, further comprises: sending instructions to each of the plurality of repositories in the source environment to export the metadata; receiving the metadata from each of the plurality of repositories; and adding the metadata to the metadata archive file.

In some embodiments, sending instructions to each of the plurality of repositories in the target environment to import the metadata from the metadata archive, further comprises: sending instructions to each of the plurality of repositories in the target environment to backup metadata stored in each of the plurality of repositories in the target environment. In some embodiments, a migration hierarchy is defined among the plurality of repositories in the target environment and each of the plurality of repositories imports the metadata according to the migration hierarchy. In some embodiments, the method can further include determining that the import failed from at least one repository; and sending a request to each of the plurality of repositories to restore the metadata stored in each of the plurality of repositories using the backup archive.

In some embodiments, a system for migrating application customizations between environments, includes a plurality of repositories, wherein each repository includes metadata associated with one or more application customizations; and a pluggable migration framework including an orchestrator executing on a computer including a computer readable medium and processor, wherein the orchestrator receives migration requests from one or more client computers and manages the plurality of repositories. The orchestrator can be configured to receive a request to export application customizations, wherein the request is received from a source environment; archive metadata from one or more repositories in the source environment to create a metadata archive; receive a request to download the metadata archive from the source environment; receive a request at the orchestrator to import the application customizations, wherein the request is received from a target environment and wherein the request includes the metadata archive; and send instructions to each of the one or more repositories in the target environment to import the metadata from the metadata archive.

The foregoing, together with other features and embodiments will become more apparent upon referring to the following specification, claims, and accompanying drawings.

DETAILED DESCRIPTION OF THE INVENTION

Figure 1:
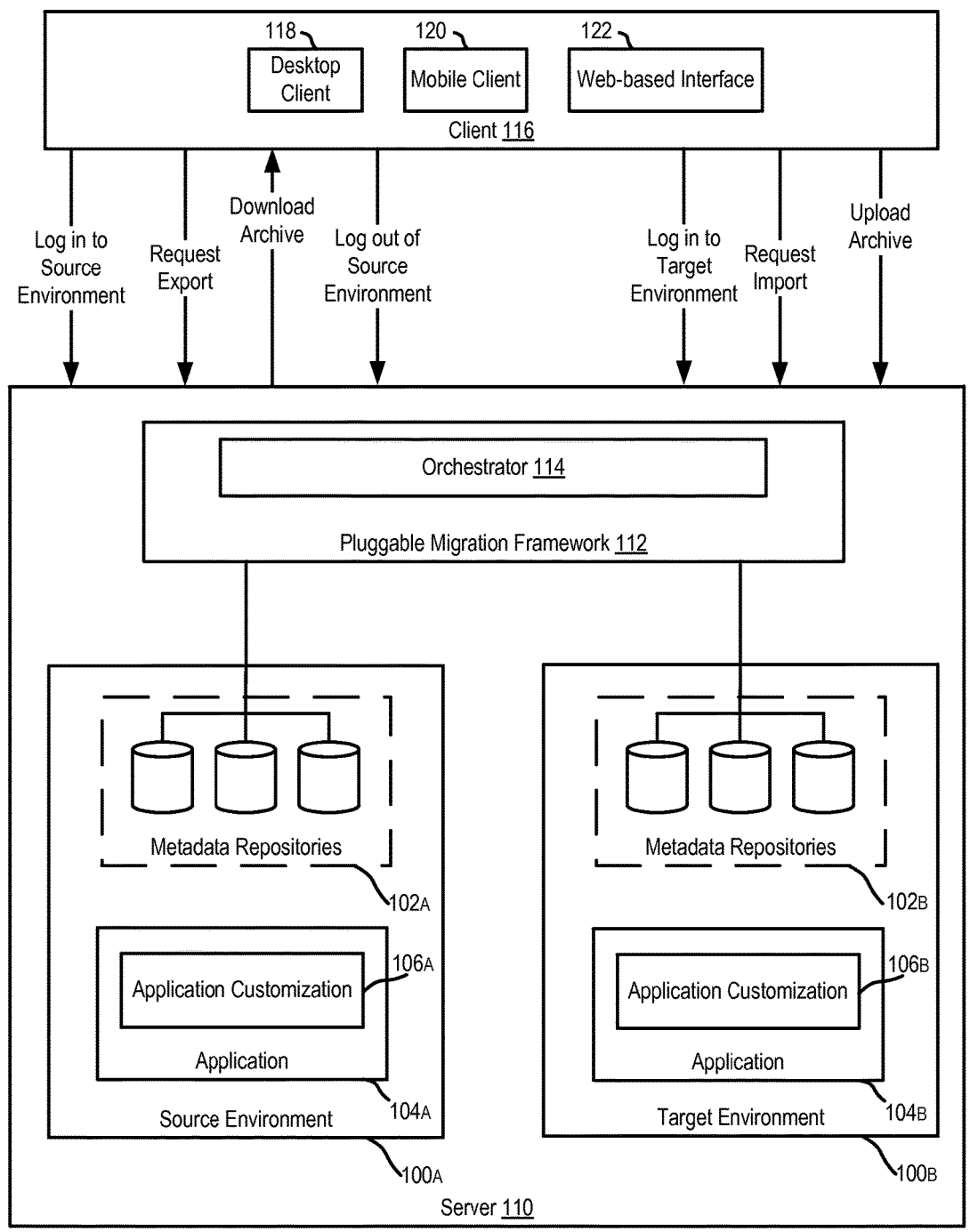
FIG. 1 shows a block diagram of a system that includes a pluggable migration framework, in accordance with an embodiment of the present invention.

Embodiments of the present invention are directed to a pluggable migration framework that manages the transfer of application customizations between environments. A pluggable migration framework can interface with a plurality of repositories that each store metadata related to one or more applications. A user can customize the applications to suit the user's business requirements. The user can develop and test the customized applications in a source environment, such as a test environment, and the customized features can be stored as metadata in one or more of the plurality of repositories. The customized application may not be accessible to other users in the test environment. When the customized application is ready to be used by others, it can be migrated to a target environment, such as a production environment. The pluggable migration framework can include an orchestrator that enables the user to export metadata from the plurality of repositories in the source environment, and import the metadata to a plurality of repositories in the target environment. This enables users to migrate custom applications between environments without requiring the user to re-implement the custom features.

In some embodiments, users can customize applications by creating new objects and/or customizing existing objects, creating new pages and/or customizing existing pages, creating new reports and/or customizing existing reports, adding and/or customizing database tables (e.g., using Flexfields), and creating new or updated security policies for managing and accessing the application customizations. As described above, users can develop and test application customizations in a test or development environment before making the customized applications available to other users by moving them to a production environment. Embodiments of the present invention provide a simple, consolidated user interface and underlying infrastructure to help users migrate their customizations from one environment to another. In some embodiments, such as those implemented in a cloud-based environment, the user may not have access to system interfaces and may not know where in the "cloud" the customizations are stored at any given time. Accordingly, in some embodiments, the customization migration process can be performed using a browser-based user interface that does not require IT support involvement.

In accordance with an embodiment, the pluggable migration framework can include an orchestrator that provides central selection, initiation, and monitoring of the export and import jobs. The orchestrator can bundle exported application customizations (e.g., metadata artifacts) into a customization set archive file (e.g. a zip, jar, or other archive) to simplify the migration from one environment to another. An application customization may appear from a user's perspective to comprise a single discrete change to an application (e.g., adding a new page, or changing the definition of a field). However, the metadata that defines a particular application customization may be stored across multiple repositories. For example, when a user adds a new page, the application metadata that defines the new page can be stored in one repository and a security policy that determines who can access the new page can be stored in a different repository. The orchestrator can migrate metadata stored across a plurality of repositories. In some embodiments, a user can select which repositories are to be migrated and/or can select one or more application customizations to migrate. The orchestrator can identify metadata that defines the selected application customizations in one or more repositories and export the metadata to an archive file. The user can download the exported archive from a test environment (or any source environment) and then upload the content to a production environment (or any target environment).

The pluggable migration framework is an extensible orchestration framework for migrating application customizations for a plurality of different applications. Applications can register with the pluggable migration framework by providing logic (e.g. a task flow) that includes application-specific migration methods. In some embodiments, the migration methods can include an export method, an import method, a backup method, and a restore method. This allows each application to use its own preexisting migration methods with the pluggable migration framework without requiring applications to implement new migration methods specific to the migration framework, simplifying the integration of different applications with the pluggable migration framework. In some embodiments, the pluggable migration framework can pull status updates from an application during execution of a migration method and display the status updates to the user. The pluggable migration framework enables the user to migrate application customizations from a central interface, without having to switch between different applications and/or consoles and without having to access underlying system interfaces.

FIG. 1 shows a block diagram of a system that includes a pluggable migration framework, in accordance with an embodiment of the present invention. Embodiments of the present invention are directed to transferring metadata that represents customizations made to applications from one environment 100A (such as a test environment) to another environment 100B (such as a production environment). Each environment may include a plurality of metadata repositories 102A, 102B. The metadata maintained in the plurality of repositories 102A, 102B defines one or more applications 104A, 104B. A default set of metadata can be provided to a customer which defines a default configuration of the one or more applications 104A, 104B. The customer can customize the applications by adding one or more application customizations 106A, 106B to more closely suit their business needs. Metadata that defines the one or more application customizations 106A, 106B may be stored in the plurality of metadata repositories 102A, 102B.

In some embodiments, the metadata repositories can include a security repository that defines roles and privileges for users who access the applications. Privileges define actions that roles can execute. For example, a sales manager role may have a privilege defines enabling the sales manager role to view sales statistics and employee information. Roles can be assigned to users to enable the users to execute the actions defined by the role's privileges. When a user updates or changes roles and privileges to suit their business organization, those changes are stored as metadata in the security store. Shared functionality that can be used across multiple applications and platforms (such as error message processing) can be stored in a metadata services repository. For example, if incomplete or improper data is provided in an application, an error message can be provided based on error message metadata stored in the metadata services repository. In some embodiments, the metadata services repository can include definitions that determine how applications are rendered to users, and how users interact with the applications, business rules, business process definitions, and other metadata. Other repositories can include business intelligence, data integration, and other repositories.

As described above, when a user customizes an application, metadata can be modified in a one or more repositories from the plurality of repositories 102A. For example, a customer can create a new page in an application that provides data to a user that was not exposed by default by the application. The new page definition may be stored in the metadata services repository 106. When the customer creates the new page, they may also create security rules for the new page, such as a new role having a privilege to access and/or modify the new page and data. These security rules are customizations that can be stored in the security repository. In traditional development environments, a developer has complete access to and control over the development environment, including the locations at which application customizations may be stored. However, in cloud-based environments that the customer may only access through a web-based interface, the customer may not be aware of which repositories include the customizations or how to access those repositories directly. Typically customized applications are developed and tested in a test environment. To make the customized applications available to other users, the customized application is published, or moved, to a production environment. In some embodiments, one system (e.g., a hardware computer) can host multiple environments (such as a test environment and a production environment). In some embodiments, environments can be distributed across a plurality of systems in a network, such as a cloud-based system.

In some embodiments, a server 110 can include a pluggable migration framework 112 that can interface with the source environment 100A and the target environment 100B. In some embodiments, source environment 100A, target environment 100B and pluggable migration framework 112 may be implemented on the same server computer 110, as shown in FIG. 1. In other embodiments, the source environment 100A, target environment 100B and pluggable migration framework 112 may be distributed across a plurality of servers. An orchestrator 114 can centrally manage metadata across the plurality of repositories according to migration requests received from a client computer 116. The orchestrator provides a central framework that different repositories can plug into. The orchestrator can publish a standard interface that is implemented by each repository provider. For example, an archive file that conforms to the standard interface can be included with a repository. The presence of this archive file enables the orchestrator to identify the repository as being registered with the framework. The orchestrator can identify the archive file and locate methods that implement the standard interface at the repository. The methods can include export, import, backup, restore, and other methods. Each method can be used to call a corresponding method at the repository. Each repository can have repository-specific methods and the archive file for the repository can indicate where the methods are stored and how the methods are invoked. For example, if a repository already includes a backup method, a new backup method does not need to be implemented to conform to the interface. Instead a helper method can be defined that conforms to the interface and can be used to invoke the legacy method at the repository. By centrally managing the metadata repositories, the orchestrator 114 can automate the process of exporting and importing customizations from one environment to another.

In some embodiments, the orchestrator 114 can export all metadata defining customizations that have been made at the time an export is executed. Additionally, or alternatively, the orchestrator can export subsets of metadata corresponding to particular customizations or temporal snapshots (such as all customizations created between two timestamps). In some embodiments, a user can develop custom applications in a sandbox testing environment, and once testing is complete export those custom applications from the sandbox to the production environment. As used herein, a "sandbox" can refer to a temporary storage area used to save application customizations before they are committed or discarded. This allows customizations to be previewed and approved for use before the customizations are visible to all users.

As shown in FIG. 1, a user can access the pluggable migration framework through a user interface on client 116, such as a desktop client 118, a mobile client 120, or a web-based (e.g., browser-based) interface 122. For example, from client 116, the user can log-in to the source environment. While logged-in to the source environment, the user can access the pluggable migration framework through a web-based interface. In some embodiments, the source environment may include a link called Customization Migration that, when selected, begins the migration process for the user. The user can request to export application customizations and be prompted to name and describe the export. In some embodiments, the user can be prompted to select which repositories (such as the security store, metadata services, business intelligence, or other repositories) include metadata to be exported. In some embodiments, finer grain selections can be provided and the user can be prompted to select particular applications or particular customizations to export. Once the user has made their selections, the orchestrator 114 can execute an export function at each selected repository. The orchestrator can then package the resulting metadata from each repository as an archive and make the archive available to the user to download. In some embodiments, the archive may be stored by the orchestrator until the use requests to download the archive.

In some embodiments, the download may be started automatically once the archive has been created.

In accordance with an embodiment, to import application customizations the user can log out of the source environment and then log in to the target environment. In some embodiments, the user may select between available environments on a log-in interface presented by server 110. The user may then access the pluggable migration framework while logged-in to the target environment. For example, the user can log out of the source environment after downloading the exported customizations archive to local storage and then log in to the target environment. The user can then access an incoming (import) tab or link through the web interface and upload the archive from local storage and request that the customizations be imported from the archive. In some embodiments, import can be disabled if another upload is in progress. The orchestrator can then import the customizations from the archive to each repository. As described further below, the import process can include first backing up the current state of the target environment to provide a restore point in case the import is unsuccessful or needs to be rolled back.

Figure 2:
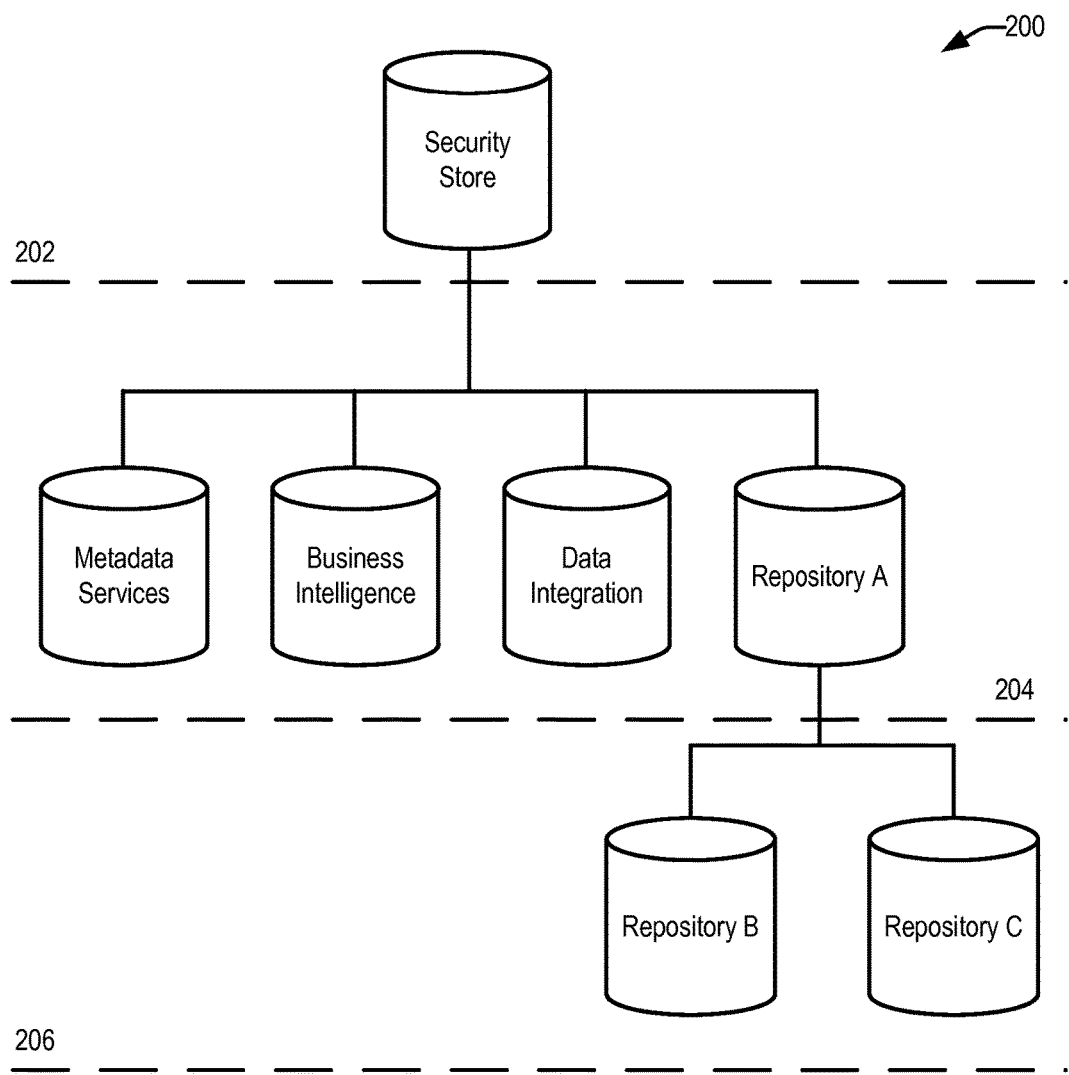
FIG. 2 shows a hierarchy of repositories, in accordance with an embodiment of the present invention.

FIG. 2 shows a hierarchy 200 of repositories, in accordance with an embodiment of the present invention. As shown in FIG. 2, metadata repositories can be organized according to a migration hierarchy. As described further below with respect to FIGS. 3-5, export and import of customizations from/to various metadata repositories can generally be performed in parallel, saving processing time and resources in the process. However, due to security concerns and/or dependencies between the metadata repositories, a migration hierarchy can be defined that defines an export/import order for the metadata repositories. For example, a first level 202 of the hierarchy includes the security store. During an import operation using hierarchy 200, the security store is imported first, ensuring that current security settings are in place before making any other changes. After the security store is successfully migrated, the repositories in the second level 204 can be imported in parallel, followed by the repositories in the third level 206. Although a three level hierarchy is shown, hierarchies having greater or fewer levels representing more complex or simpler relationships between the metadata repositories can also be used.

In embodiments where a subset of repositories or a particular application customization can be selected for migration, the hierarchy 200 can be used to identify any related repositories that need to be migrated. For example, if the user selects Repository B for migration, the hierarchy 200 can be used to identify that Repository B is dependent on Repository A and the Security Store. The orchestrator can then export and archive metadata from Repository B, Repository A, and the Security Store. When the archive is later imported to update Repository B in a target environment, Repository A and the Security Store in the target environment will also be updated.

Figure 3:
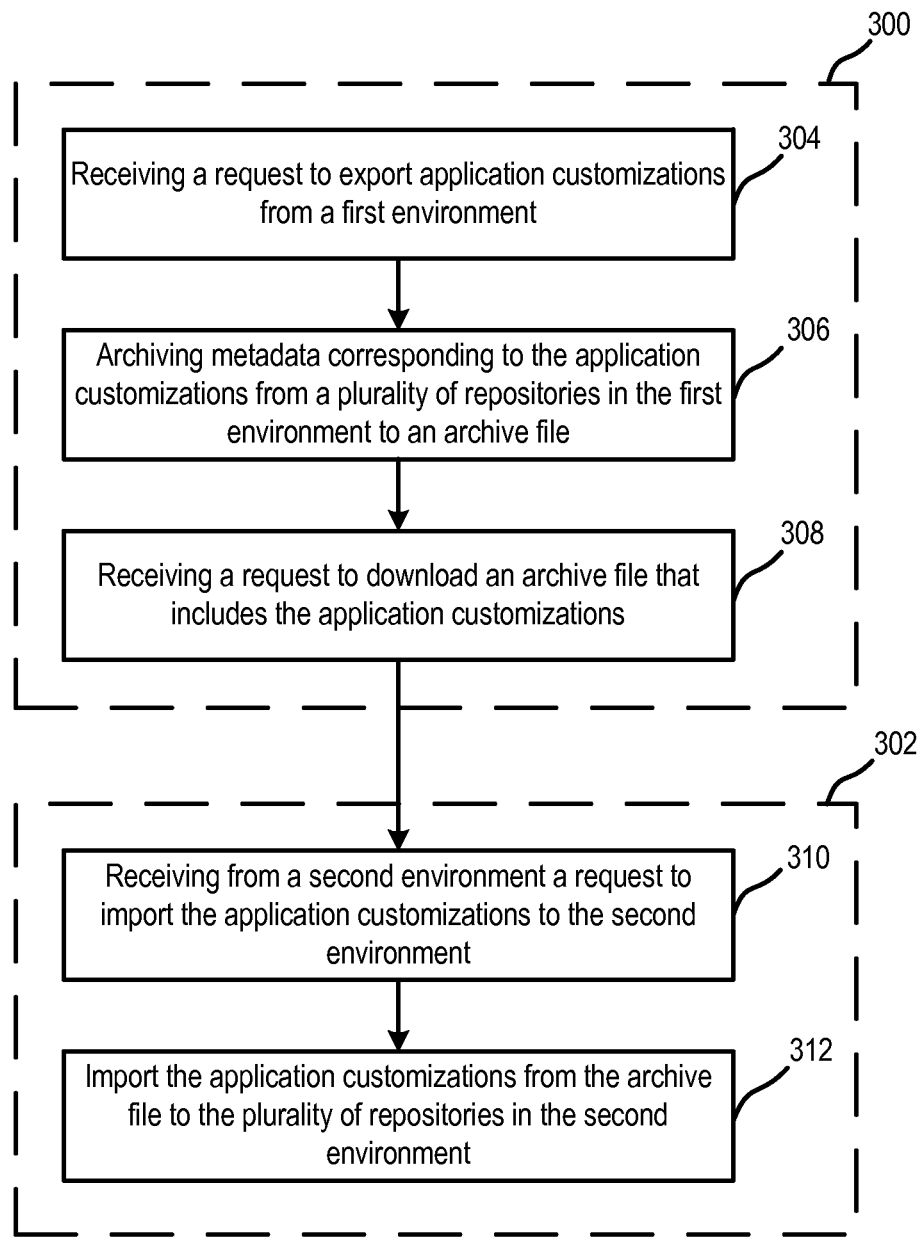
FIG. 3 shows a method of migrating application customizations, in accordance with an embodiment of the present invention.

FIG. 3 shows a method of migrating application customizations, in accordance with an embodiment of the present invention. Migration of the application customizations includes both an export process 300 and an import process 302. As described above, the user may log-in to a first environment where the application customizations are being developed and tested and request an export of the application customizations. The user may then log-out of the first environment and log-in to a second environment and import the application customizations. As shown in FIG. 3, at block 304, a request is received at an orchestrator to export application customizations. The request to export can be received from a source environment, such as a development or test environment. In some embodiments, the request can identify one or more repositories to export and/or one or more particular application customizations which may correspond to metadata stored in several repositories. The orchestrator can identify which repositories are to be exported using a migration hierarchy that defines dependencies among the plurality of repositories. For example, if a request is receive to export repository A, the orchestrator can determine whether Repository A depends on any other repositories using the migration hierarchy. The orchestrator can then select any repositories that Repository A depends on for export. Once the repositories to be exported are identified, the orchestrator can send instructions to each of the identified repositories in the source environment to export their metadata. In response, the orchestrator can archive the metadata received from the repositories in the source environment. At block 306, the orchestrator can create a metadata archive that includes the metadata exported by the repositories.

At block 308, the orchestrator can receive a request to download the metadata archive from the source environment. The user can download the metadata archive to local storage or to any storage location that is accessible to the target environment. After successfully exporting the metadata archive, the user can then import the metadata archive to complete the migration of the application customizations. At block 310, the orchestrator receives a request to import the application customizations. The request can be received from a target environment and can include the metadata archive. For example, the user can download the metadata archive to local storage while logged into the source environment. The user can then log out of the source environment and log into the target environment. The user can then upload the metadata archive from local storage with their import request. At block 312, in response to the import request, the orchestrator can send instructions to the repositories in the target environment to import the metadata from the metadata archive. The instructions to import can be sent to the repositories in parallel, according to the migration hierarchy.

The instructions to import the metadata can include instructions to each repository to first backup their current states. This creates a restore point to which each archive can be returned in the event there is an error during the import process or if errors are later identified after a successful importation. Additional details of these migration processes are provided below, with respect to FIGS. 4-5.

Figure 4:
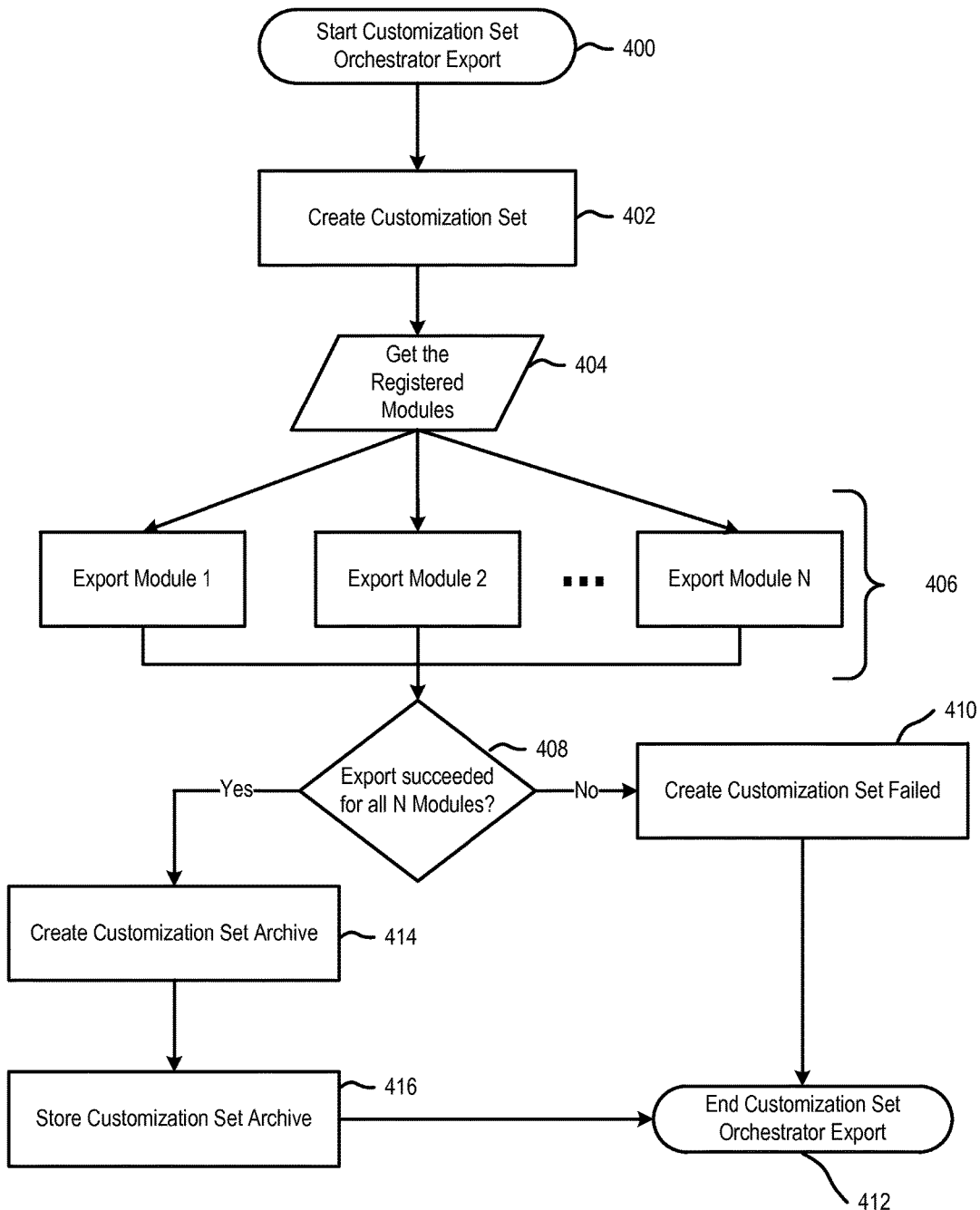
FIG. 4 shows a flowchart of exporting application customizations, in accordance with an embodiment of the present invention.

FIG. 4 shows a flowchart of exporting application customizations, in accordance with an embodiment of the present invention. As shown in FIG. 4, at step 400 the orchestrator 102 can initiate an export process (e.g., in response to a request received from a user). At step 402, a customization set is created where each repository's exported metadata will be stored. At step 404, each registered repository (also referred to as a module) is identified by the orchestrator. As shown in FIG. 4, a plurality of modules (modules 1-N) can be registered with the orchestrator. At step 406, each registered repository is instructed, in parallel, to export their metadata. For example, the orchestrator can send each repository a message requesting the repository to execute an export method. Each repository can then execute the export method identified in the repository's archive file. At step 408, the orchestrator determines whether export has succeeded for all repositories. In some embodiments, each repository's export method can include sending a response to the orchestrator indicating success or failure of the export. In some embodiments, each repository can provide progress updates for the export method including one or more of a percentage complete and an estimated time to completion. At step 410, if any repository fails to export, the customization set can be marked as failed and at step 412 the export process can end. At step 414, if at all repositories succeed, the customization set can be archived as, for example, a zip file or a jar file. At step 416, the customization set archive can be downloaded to a known location such as in local storage or a remote location accessible to the user. The export process can then end at step 412.

Figure 5A:
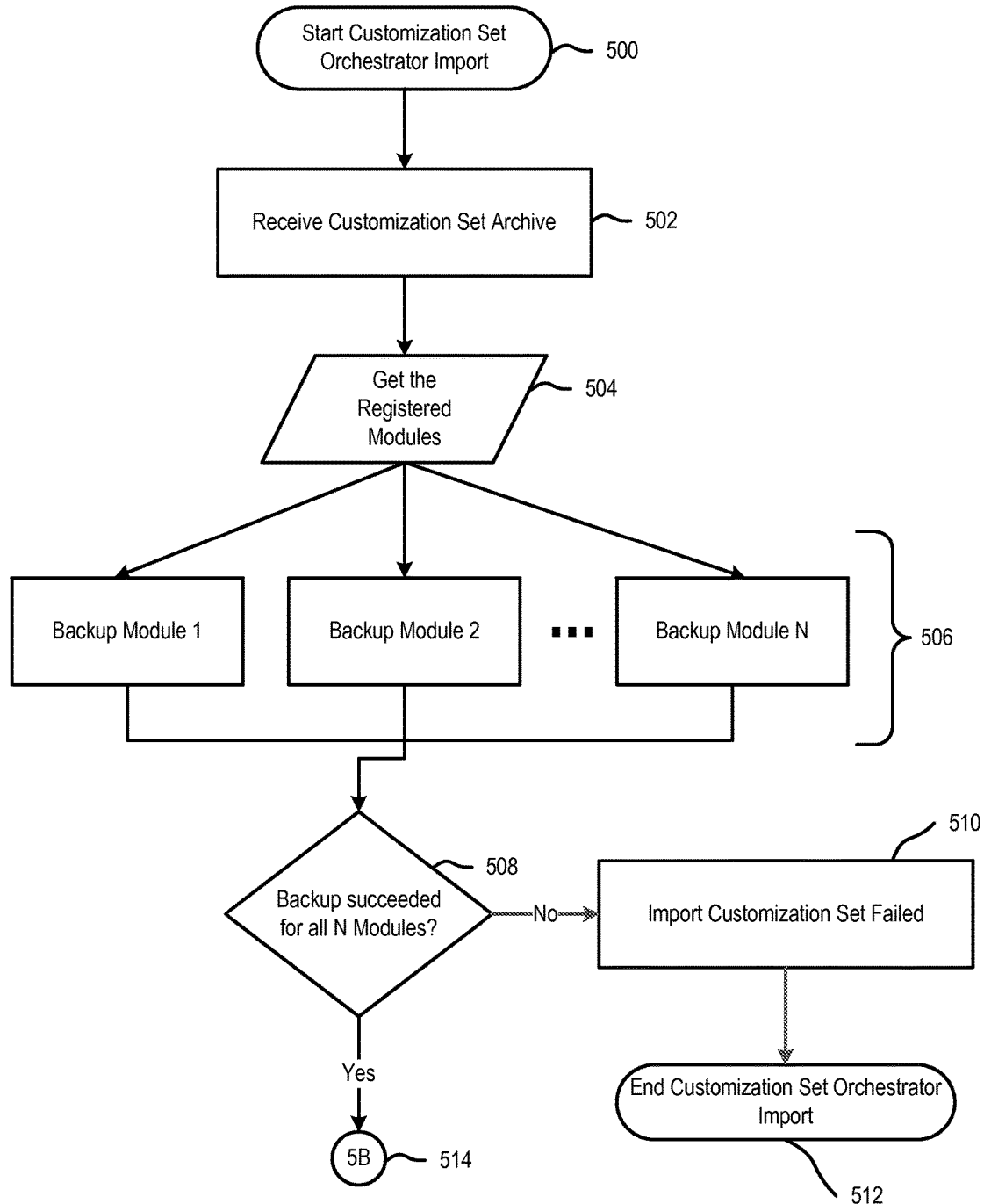
FIGS. 5A-5C shows a flowchart of importing application customizations, in accordance with an embodiment of the present invention.
Figure 5B:
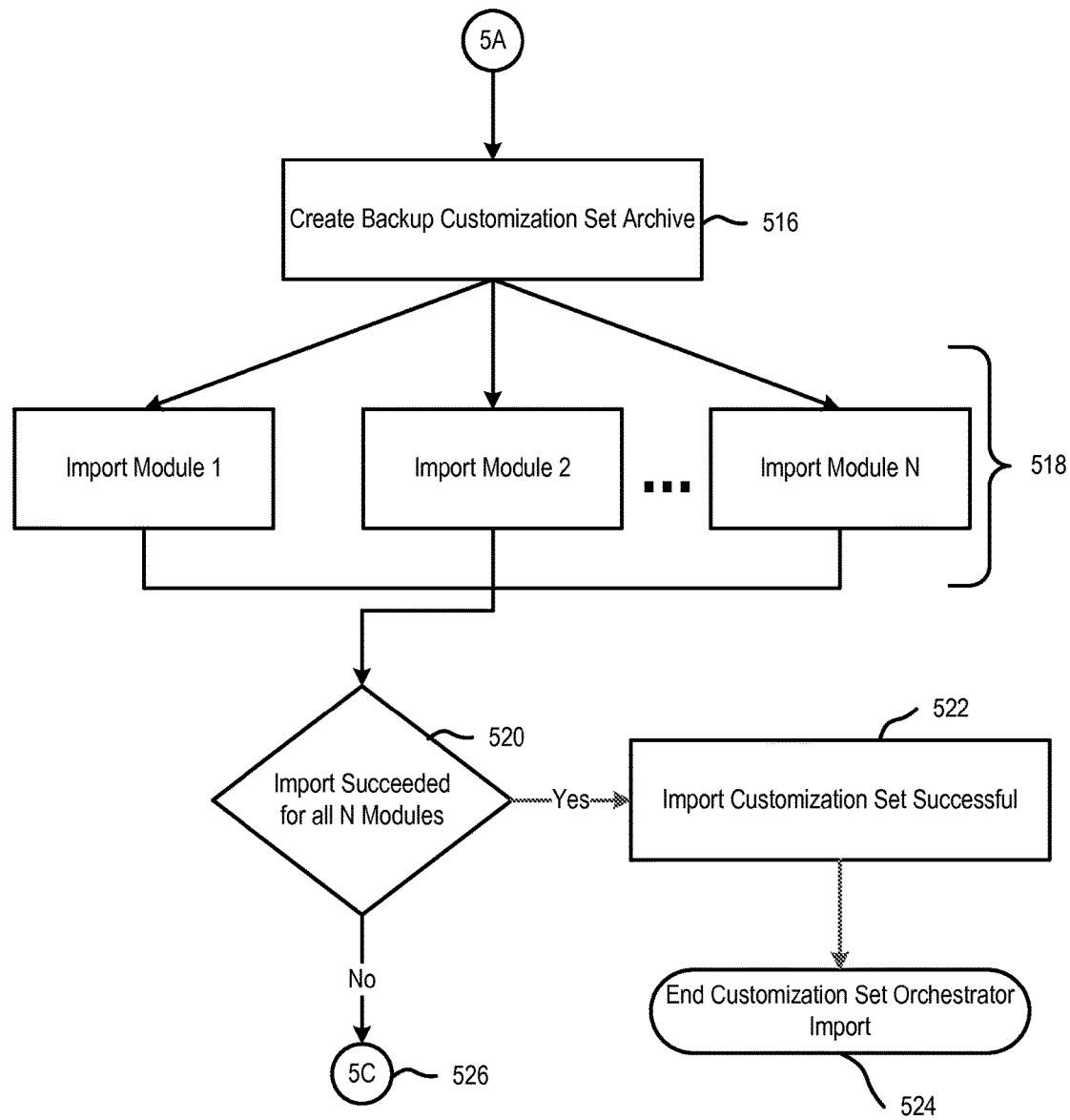
Figure 5C:
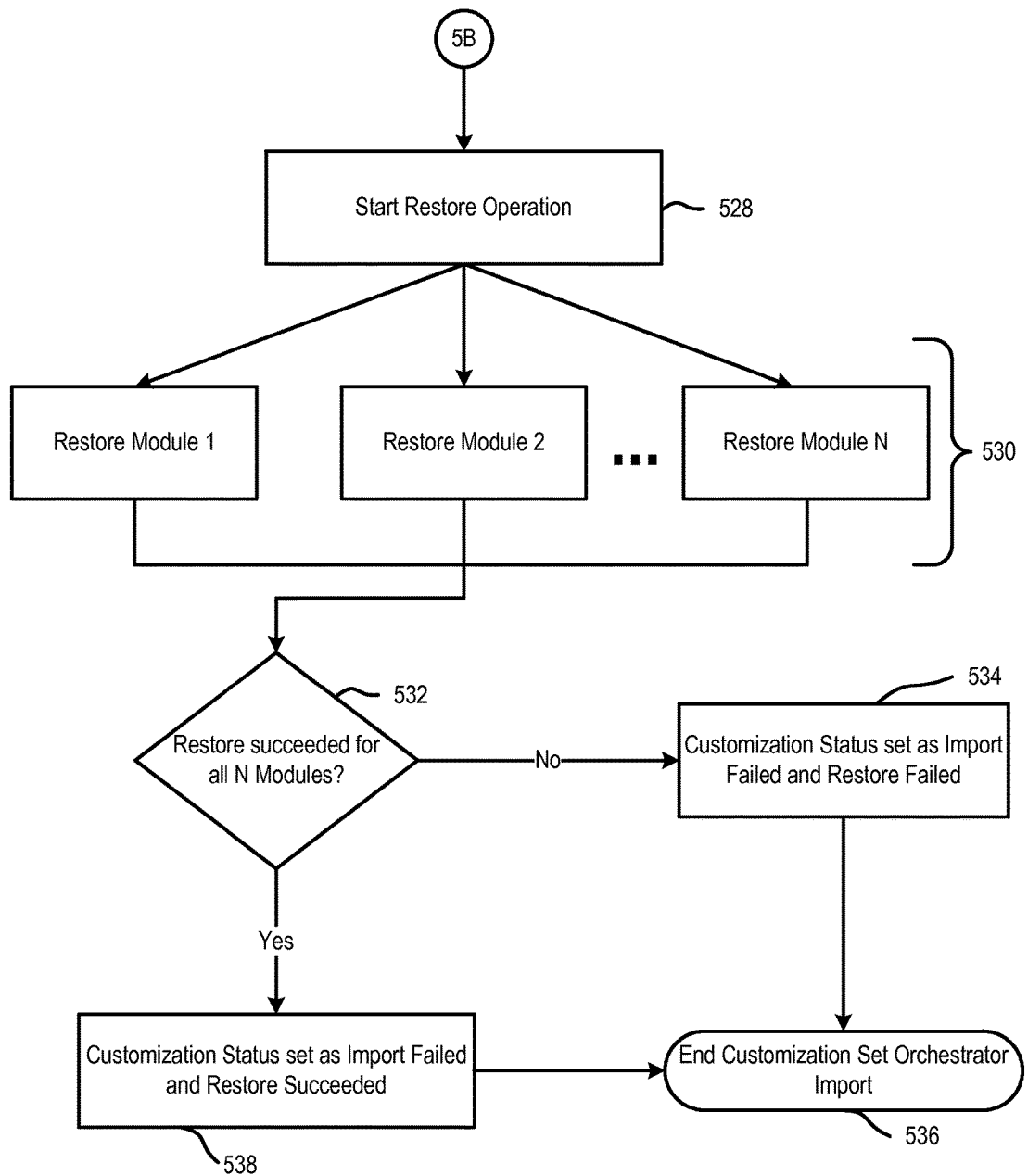

FIGS. 5A-5C shows a flowchart of importing application customizations, in accordance with an embodiment of the present invention. As shown in FIG. 5A, at step 500 the orchestrator can initiate an import process to import customizations to each registered respository. At step 502, a user can select a customization set archive that includes metadata for one or more of the repositories to be imported. In some embodiments, the user can select which repositories and/or customizations are to be imported in the import process. In some embodiments, all customizations in the customization set archive can be automatically imported without further input from the user. At step 504, the orchestrator identifies each registered repository (also referred to as modules). As described above, each registered repository can include an archive that defines repository-specific interfaces that enable the repository to plug-into the orchestrator. The archive can include backup methods that can be invoked by the orchestrator. At step 506, the orchestrator can instruct each registered repository to perform a backup operation. The instructions can be sent to each registered repository in parallel. The backup operation can backup the current state of each repository and provides a restore point in case the import operation is unsuccessful or causes unforeseen errors. In some embodiments, multiple backup points can be set by the user and/or by the orchestrator. At step 508, the orchestrator can determine whether each repository has successfully backed-up its current state. At step 510, if any repository has failed to backup the import process can be marked failed and at step 512 the import process can end. If each repository has successfully backed-up, processing can proceed at 514.

As shown in FIG. 5B, at step 516 a backup customization set archive is created and stored to a backup location. In some embodiments, a user can be prompted to provide a backup location after successful completion. In some embodiments, the user can provide the backup location with the import request. At step 518, import instructions are sent to each registered repository. As described above, each registered repository can include an archive that defines repository-specific interfaces that enable the repository to plug-into the orchestrator. The archive can include import methods that can be invoked by the orchestrator. In some embodiments, each repository can be instructed to import in parallel. In some embodiments, a hierarchy can be defined for the repositories that indicates an order in which each repository imports the customization set data. For example, in a hierarchy the security repository can be defined as the first repository to import and then each remaining repository can import in parallel. Alternative hierarchies can be similarly defined based on other relationships or dependencies among the repositories. At step 520, the orchestrator can determine if the import is successful for all repositories. If the import was successful, at step 522 the import process can be marked successful and at step 524 the import process can end. If the import process was not successful for all modules, processing can proceed at 526.

As shown in FIG. 5C, if the import process was not successful, at step 528 a restore process can be started. At step 530, restore instructions are sent to each registered repository to return to the previous state using the backup customization set archive. As described above, each registered repository can include an archive that defines repository-specific interfaces that enable the repository to plug-into the orchestrator. The archive can include restore methods that can be invoked by the orchestrator. In some embodiments, each repository can be instructed to import in parallel. In some embodiments, a hierarchy can be defined for the repositories that indicates an order in which each repository restores the backup customization set data. At step 532, the orchestrator can determine if the restore is successful for all repositories. If the restore was not successful, at step 534 the customization status can be marked as import failed and restore failed. The import process can then end at step 536. If the restore process was successful for all modules, at step 538 the customization status can be set to import failed and restore successful, indicating that each repository has been restored to its state from before the import process was initiated. At step 536, the import process ends.

In some embodiments, the user can begin an export or import process using a script in addition to a web-based interface. For example, the user can call a migration object (e.g. an Mbean) using a script to do export/import/restore instead of through a graphical user interface. The migration object can receive the same parameters as the web-based interface (e.g., a list of modules to migrate, points in time between migration, etc.). The migration object can be included in the pluggable migration framework such that any application-specific connection/configuration requirements can be applied to the migration object. The orchestrator can then be called by the migration object, look at the registration metadata and call the migration methods. In some embodiments, the web-based interface can display a record of any export/import/restore activity that was conducted using a script.

In some embodiments, the pluggable migration framework can provide incremental migration through which application customizations can be migrated at regular time intervals. In some embodiments, a time interval can refer to a period of time since a specific customization set was last migrated. In other embodiments, a time interval can refer to a period of time between migrations of a specific customization set. In some embodiments, each repository can define a list of name-value pairs that it can use to track which metadata corresponds to each application customization. An API can be provided through which the repositories can write the name-value pairs to the customization set metadata using a utility. In some embodiments, a change history can be displayed that graphically indicates what changes have been made after a migration.

Figure 6:
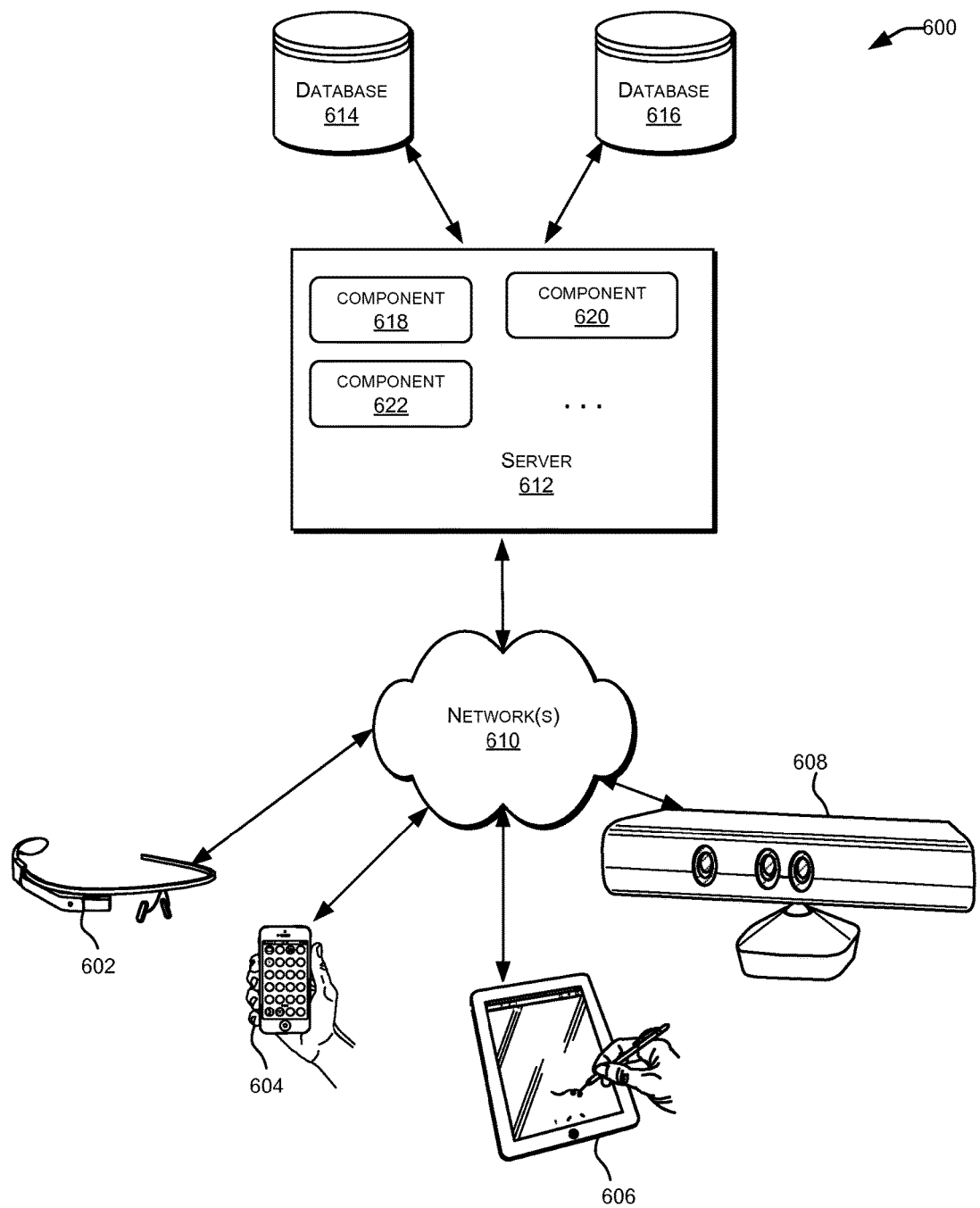
FIG. 6 depicts a simplified diagram of a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
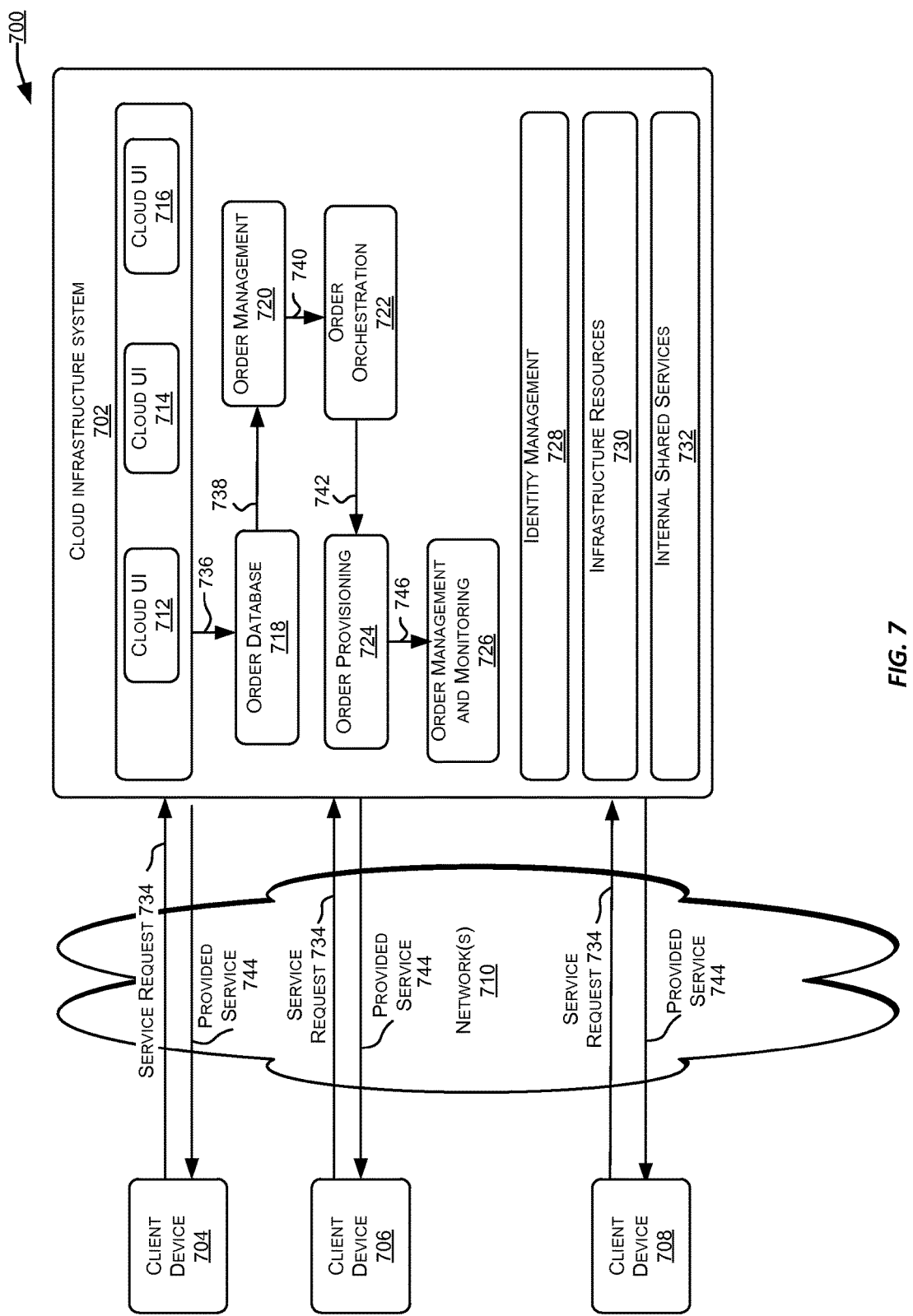
FIG. 7 is a simplified block diagram of components of a system environment by which services provided by the components of an embodiment system may be offered as cloud services, in accordance with an embodiment of the present disclosure.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 702 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 702 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 702 may include an identity management module 728. Identity management module 728 may be configured to provide identity services, such as access management and authorization services in cloud infrastructure system 702. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
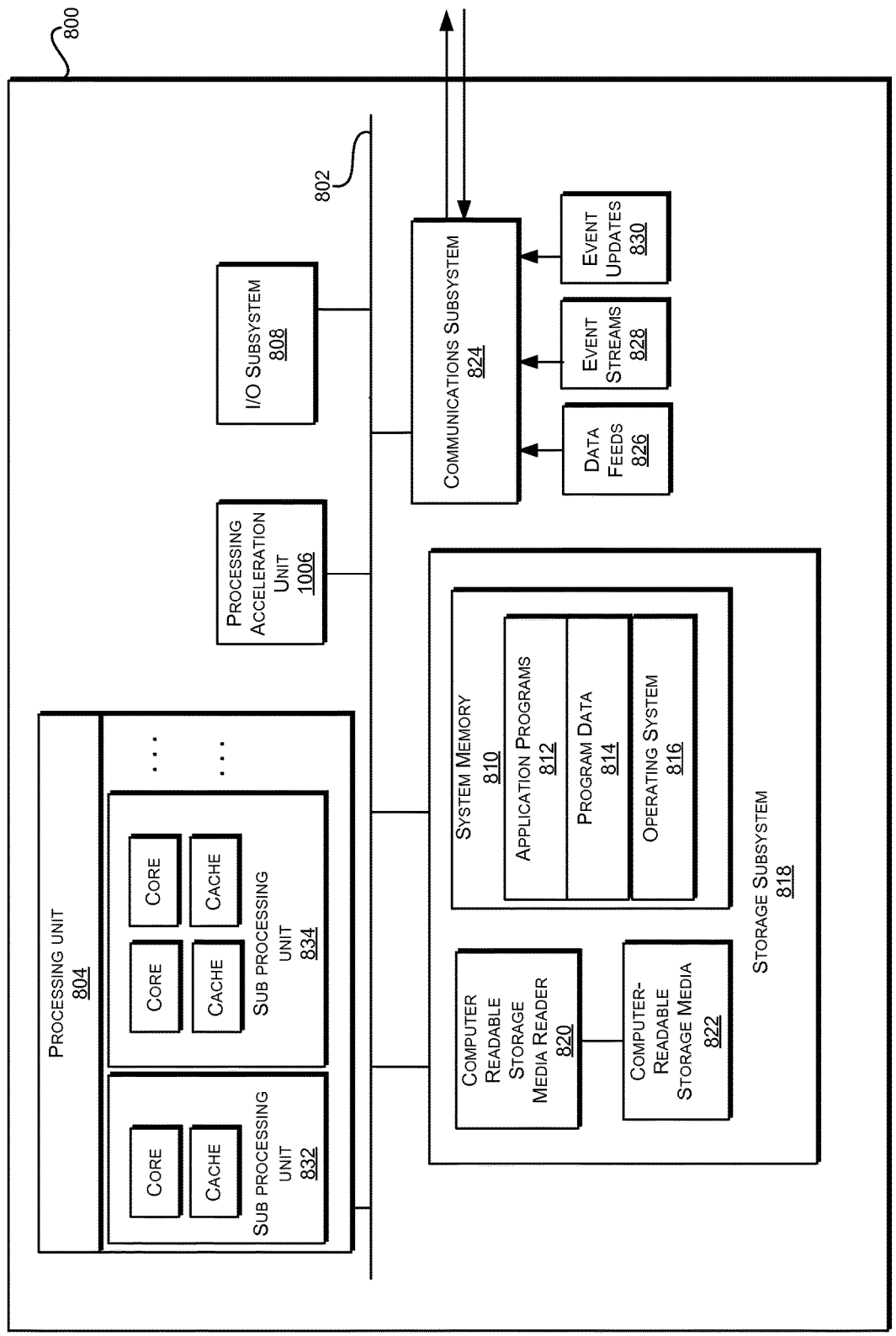
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of migrating application customizations between environments, the method comprising:
   publishing, by an orchestrator of a pluggable migration framework configured to interface with a plurality of repositories from a plurality of different environments and configured to centrally manage metadata for the plurality of repositories, a standard interface for centrally managing metadata from the repositories of the plurality of different environments;
   receiving, at the orchestrator, a request from a client device to export application customizations from a source environment to a target environment, wherein the orchestrator executes on a computer including a non-transitory computer readable medium and processor;
   identifying, by the orchestrator, one or more repositories in the source environment from which the metadata is exported, wherein the one or more repositories from the source environment are identified using a migration hierarchy defining dependencies among the one or more repositories;
   archiving, by the orchestrator, the metadata from one or more repositories in the source environment to create a metadata archive, wherein each of the one or more repositories stores metadata comprising the application customizations for a plurality of different migration tools, and wherein the metadata obtained from the one or more repositories includes a method for importing metadata specific to a migration tool for the one or more repositories, respectively;
   receiving, by the orchestrator, a request to import the metadata in the metadata archive from the source environment to the target environment;
   automatically identifying, by the orchestrator, the method for importing the metadata from the metadata in the metadata archive, wherein the metadata includes the application customizations for the one or more repositories; and
   importing, by the orchestrator, the metadata including the application customizations from the metadata archive to one or more repositories in the target environment based on the method for importing the metadata in the metadata archive identified by the orchestrator and the migration hierarchy, wherein the target environment comprises the metadata including the application customizations.

2. The method of claim 1, wherein instructions to each of the plurality of repositories in the target environment are sent in parallel.

3. The method of claim 1, wherein the one or more repositories are a subset of a plurality of repositories.

4. The method of claim 1, wherein receiving, at an orchestrator, executing on a computer including a computer readable medium and processor, a request to export application customizations, further comprises:
   sending instructions to each of the plurality of repositories in the source environment to export the metadata;
   receiving the metadata from each of the plurality of repositories; and
   adding the metadata to the metadata archive.

5. The method of claim 1, wherein importing the metadata from the metadata archive, further comprises:
   sending instructions to each of the plurality of repositories in the target environment to backup metadata stored in each of the plurality of repositories in the target environment.

6. The method of claim 5, wherein a migration hierarchy is defined among the plurality of repositories in the target environment and each of the plurality of repositories imports the metadata according to the migration hierarchy.

7. The method of claim 5, further comprising:
   determining that the importing failed from at least one repository; and
   sending a request to each of the plurality of repositories to restore the metadata stored in each of the plurality of repositories using a backup archive.

8. The method according to claim 1, wherein the orchestrator centrally manages metadata from a plurality of repositories in the plurality of different environments.

9. The method according to claim 1, wherein the source environment is an application development environment.

10. The method according to claim 1, wherein the metadata archive for the one or more repositories comprises method storage location information and method invocation information.

11. The method according to claim 10, wherein in response to the method for importing metadata for the one or more repositories already existing in the one or more repositories, respectively, invoking a legacy method for importing metadata.

12. The method according to claim 1, wherein the method for importing the metadata for the one or more repositories is identified by the orchestrator without user intervention.

13. The method according to claim 1, wherein the migration hierarchy defines dependencies of one or more repositories that are dependent on the identified one or more repositories in the source environment from which the metadata is exported.

14. A non-transitory computer readable storage medium including instructions stored thereon which, when executed by a processor, cause the processor to perform a method comprising:
   publishing, by an orchestrator of a pluggable migration framework configured to interface with a plurality of repositories from a plurality of different environments and configured to centrally manage metadata for the plurality of repositories, a standard interface for centrally managing metadata from the repositories of the plurality of different environments;

receiving, at the orchestrator, a request from a client device to export application customizations from a source environment to a target environment;

identifying, by the orchestrator, one or more repositories in the source environment from which the metadata is exported, wherein the one or more repositories from the source environment are identified using a migration hierarchy defining dependencies among the one or more repositories;

archiving, by the orchestrator, the metadata from one or more repositories in the source environment to create a metadata archive, wherein each of the one or more repositories stores metadata comprising the application customizations for a plurality of different migration tools, and wherein the metadata obtained from the one or more repositories includes a method for importing metadata specific to a migration tool for the one or more repositories, respectively;

receiving, by the orchestrator, a request to import the metadata in the metadata archive from the source environment to the target environment;

automatically identifying, by the orchestrator, the method for importing the metadata from the metadata in the metadata archive, wherein the metadata includes the application customizations for the one or more repositories; and importing, by the orchestrator, the metadata including the application customizations from the metadata archive to one or more repositories in the target environment based on the method for importing the metadata in the metadata archive identified by the orchestrator and the migration hierarchy, wherein the target environment comprises the metadata including the application customizations.

15. The non-transitory computer readable storage medium of claim 14, wherein the instructions to each of the plurality of repositories in the target environment are sent in parallel.

16. The non-transitory computer readable storage medium of claim 14, wherein the one or more repositories are a subset of a plurality of repositories.

17. The non-transitory computer readable storage medium of claim 14, wherein receiving a request at an orchestrator to export application customizations, further comprises:
sending instructions to each of the plurality of repositories in the source environment to export the metadata;
receiving the metadata from each of the plurality of repositories; and
adding the metadata to the metadata archive.

18. The non-transitory computer readable storage medium of claim 14, wherein importing the metadata from the metadata archive, further comprises:
sending instructions to each of the plurality of repositories in the target environment to backup metadata stored in each of the plurality of repositories in the target environment.

19. The non-transitory computer readable storage medium of claim 18, wherein a migration hierarchy is defined among the plurality of repositories in the target environment and each of the plurality of repositories imports the metadata according to the migration hierarchy.

20. The non-transitory computer readable storage medium of claim 18, further comprising:
determining that the importing failed from at least one repository; and
sending a request to each of the plurality of repositories to restore the metadata stored in each of the plurality of repositories using a backup archive.

21. A system for migrating application customizations between environments, comprising:
a source environment configured to execute a plurality of applications, wherein the source environment includes a first plurality of repositories, wherein each of the first plurality of repositories includes metadata associated with one or more application customizations associated with the plurality of applications;
a target environment configured to execute the plurality of applications, wherein the target environment includes a second plurality of repositories;
a pluggable migration framework in communication with the source environment, the target environment, and at least one client computer, wherein the pluggable migration framework includes an orchestrator executing on a computer including a computer readable medium, a processor and a memory, and wherein the pluggable migration framework is configured to interface with repositories from a plurality of different environments, wherein the orchestrator receives migration requests from the at least one client computer and manages the first and second plurality of repositories; and
wherein, the orchestrator is configured to:
publish a standard interface for centrally managing metadata from the repositories of the plurality of different environments and configured to centrally manage metadata for the repositories;
receive a request to export application customizations from the source environment to the target environment associated with a client computer;
identify one or more repositories in the source environment from which the metadata is exported, wherein the one or more repositories from the source environment are identified using a migration hierarchy defining dependencies among the one or more repositories;
archive the metadata from the first plurality of repositories in the source environment to create a metadata archive, wherein the each of the one or more repositories stores metadata comprising the application customizations for a plurality of different migration tools, and wherein the metadata obtained from the one or more repositories includes a method for importing metadata specific to a migration tool for the one or more repositories, respectively;
receive a request to import the metadata in the metadata archive from the source environment to the target environment;
automatically identify the method for importing the metadata from the metadata in the metadata archive, wherein the metadata includes the application customizations for the one or more repositories; and
import the metadata including the application customizations from the metadata archive to the second plurality of repositories in the target environment based on the method for importing metadata in the metadata archive identified by the orchestrator and the migration hierarchy, wherein the target environment comprises the metadata including the application customizations.

22. The system of claim 21, wherein the one or more repositories are a subset of a plurality of repositories.

23. The system of claim 21, wherein receiving a request at an orchestrator to export application customizations, further comprises:
- sending instructions to each of the first plurality of repositories in the source environment to export the metadata;
- receiving the metadata from each of the first plurality of repositories; and
- adding the metadata to the metadata archive.

24. The system of claim 21, wherein importing the metadata from the metadata archive, further comprises:
- sending instructions to each of the second plurality of repositories in the target environment to backup metadata stored in each of the second plurality of repositories in the target environment.

25. The system of claim 24, wherein a migration hierarchy is defined among the second plurality of repositories in the target environment and each of the second plurality of repositories imports the metadata according to the migration hierarchy.

26. The system of claim 24, wherein the orchestrator is further configured to:
- determine that the importing failed from at least one repository; and
- send a request to each of the second plurality of repositories to restore the metadata stored in each of the second plurality of repositories using a backup archive.

* * * * *

UNITED STATES PATENT AND TRADEMARK OFFICE
CERTIFICATE OF CORRECTION

PATENT NO. : 10,229,122 B2
APPLICATION NO. : 14/478693
DATED : March 12, 2019
INVENTOR(S) : Kellner et al.

Page 1 of 1

It is certified that error appears in the above-identified patent and that said Letters Patent is hereby corrected as shown below:

In the Specification

In Column 9, Line 18, delete "respository." and insert -- repository. --, therefor.

Signed and Sealed this
Twenty-fifth Day of February, 2020

Andrei Iancu
*Director of the United States Patent and Trademark Office*